Dec. 5, 1950  J. G. BAKER  2,532,751
HIGHLY CORRECTED OBJECTIVE HAVING TWO INNER DIVERGENT
MENISCUS COMPONENTS BETWEEN COLLECTIVE COMPONENTS
Filed Sept. 29, 1949

Fig. 1,

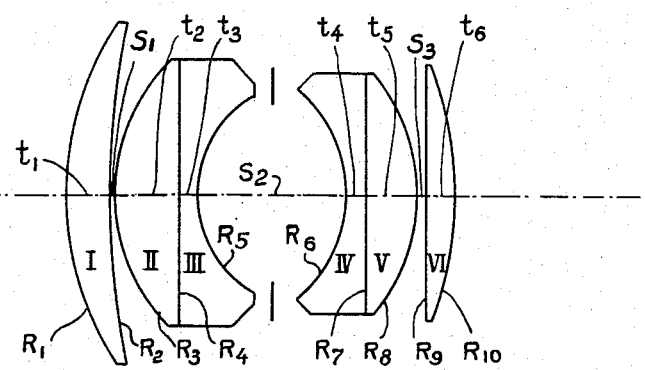

F = 1.000  f/2

| LENS | $N_D$ | $\nu$ | RADII | SPACINGS AND THICKNESSES |
|---|---|---|---|---|
| I | 1.617 | 55.0 | $R_1 = 0.578$ | $t_1 = 0.088$ |
|  |  |  | $R_2 = 1.896$ | $S_1 = 0.003$ |
| II | 1.611 | 57.2 | $R_3 = 0.351$ | $t_2 = 0.125$ |
| III | 1.605 | 38.9 | $R_4 = $ plano | $t_3 = 0.038$ |
|  |  |  | $R_5 = 0.216$ | $S_2 = 0.282$ |
| IV | 1.605 | 38.0 | $R_6 = -0.272$ | $t_4 = 0.038$ |
| V | 1.620 | 60.3 | $R_7 = $ plano | $t_5 = 0.109$ |
|  |  |  | $R_8 = -0.352$ | $S_3 = 0.003$ |
| VI | 1.620 | 60.3 | $R_9 = 5.902$ | $t_6 = 0.069$ |
|  |  |  | $R_{10} = -0.635$ |  |

Fig. 2,

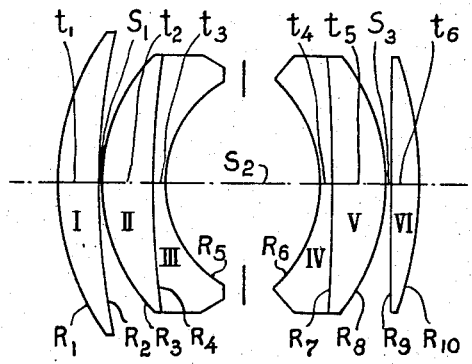

Fig. 3.

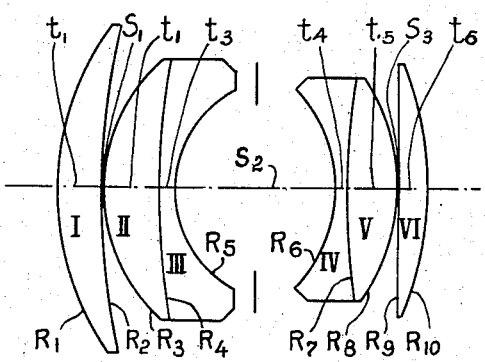

INVENTOR
James G. Baker
BY
Pennie Edmonds Morton & Barrows
ATTORNEYS

Patented Dec. 5, 1950

2,532,751

UNITED STATES PATENT OFFICE 2,532,751

HIGHLY CORRECTED OBJECTIVE HAVING TWO INNER DIVERGENT MENISCUS COMPONENTS BETWEEN COLLECTIVE COMPONENTS

James G. Baker, Orinda, Calif., assignor to The Perkin-Elmer Corporation, Glenbrook, Conn., a corporation of New York Application September 29, 1949, Serial No. 118,627

8 Claims. (Cl. 88—57)

This invention relates to optical objectives for photographic, projection, and similar purposes and, more particularly, to that class of objectives that contain a pair of meniscus components of net divergent effect lying between collective components, the meniscus components being concave to one another on opposite sides of a central stop. More specifically, the invention is concerned with novel objectives of the class referred to, which produce images far off the optical axis, that are more sharply defined than those produced by prior similar objectives, and provide uniformity of illumination over the field of view required in any given application. The new objectives afford these advantages without the use of impracticable optical materials.

At the present time, available objectives of the specified type are corrected for longitudinal and lateral color, spherical aberration, coma, astigmatism, field curvature, and distortion to a degree hitherto found satisfactory for many photographic purposes. However, the increasing use of finer grained photographic emulsions has necessitated the payment of more careful attention to the structure of the optical image over the entire angular field, in order that enlargements can be made without marked loss of resolution. Even when the faster and usually rather coarse grained photographic emulsions are used, it has been found that, in the limit, resolution depends on the smallness of the diffraction image, and, hence, on the degree of perfection of the correction of the lens system at low f-numbers. It has been also found that optical images should yield both good contrast and resolution, which means that the sharp portion of the image must be surrounded by a minimum of unfocused light. Moreover, existing types of color processes are well known to have so restricted a latitude of exposure that, for practical reasons, the lens system used in such processes must provide a high degree of uniformity of illumination to the very edge of the required angular field. Therefore, any improvement in image quality should be accompanied by freedom from pronounced vignetting. Finally, the requirements for taking photographs under conditions of low illumination, as in indoor cinephotography, or for using the finer grained photographic materials, which are generally slow, have placed an ever increasing burden on the quality of lens design, since the lens must provide optical images of all the characteristics described above, together with uniformity of illumination, at low f-numbers.

In prior objectives of the specified type, it has been customary to obtain the best rim ray agreement permitted by the basic design. The final correction of such objectives is based on the knowledge that the most effective part of the image, generally central within the bundle, must come to a focus on the adopted mean focal plane. A final correction of this type often results in a state of over-correction of the extreme rim rays at image points far off the optical axis, and the rim rays come to a focus markedly behind the mean image plane away from the lens system. In the focal plane itself, the rim rays, therefore, do not contribute to the resolution of the optical image but only add light in the nature of fog, resulting in lower contrast in the image. The latter effect admits of a larger tolerance photographically than might at first be expected, in that the aberring light has low surface brightness, and, hence, often lies on the toe of the characteristic curve of the photographic emulsion. With such lenses, it is common experience, that over-exposure produces a "muddy" image with somewhat reduced resolution.

Lenses of the type, with which this invention is concerned, have in the past achieved a high state of correction for all aberrations except oblique spherical aberration, which is to be identified with the lack of adequate rim ray agreement mentioned above. Many such prior objectives, although not all, also suffer from zonal astigmatism, whenever large angular fields are involved. Such objectives in the past have been afflicted with an unusual amount of oblique spherical aberration and it has, accordingly, been the practice heretofore to permit such objectives to suffer from vignetting in the outer portions of the angular field, in order to obtain a general improvement in the contrast of the picture, although at the cost of non-uniform illumination over the field.

The problem of counteracting the detrimental optical effect of oblique spherical aberration has, heretofore, received the attention of workers in the art, and in Aklin Patent 2,336,207, for example, the patentee discloses how residual astigmatism of the central rays may be used to obtain improved sharpness of image on the required focal plane in the presence of oblique spherical aberration. Also, in his Patent 2,343,627, Aklin discloses how astigmatism of the central pencils can be more greatly reduced over a large field than was previously found possible in objectives of the specified type, but without reduction of the oblique spherical aberration to the degree now desired. Wynne describes in Patent 2,389,016 how the reduction in oblique spherical aberration now desired can be achieved but his solution of the problem requires the use of crystal materials, which are not only unavailable for production purposes, but are also water-soluble and, hence, impractical for general use.

In explanation of how the application of the principles of the present invention achieves the desired results, it may be stated that the designers of prior similar objectives have sought to minimize the curvatures of the lens elements, with the intention thereby of reducing the state of over-correction of the extreme rim rays and, therefore, the oblique spherical aberration. In these objectives, it has been customary to employ materials of high index for the positive elements, an overall length of the lens system, that is large relative to the focal length, and a relatively large Petzval curvature. The use of such expedients does not attain the desired goal, because the flatter curves benefit the axial image but not the images far off-axis. In fact, although the total circle of confusion is somewhat smaller as a result of the flatter curvatures, the residual astigmatism in the central bundles is accentuated and the performance in resolution and microscopic contrast is impaired. The lens surfaces which are directly responsible for this condition are those on opposite sides of the central air space.

It is not immediately evident that a general steepening of the curvatures of the negative meniscus components of the lens on either side of the stop will reduce the optical effect of oblique spherical aberration on the performance of the objective and such steepening of the curvatures of those components will only produce a worse condition, unless, at the same time, the central thicknesses of the menisci are reduced below the limits heretofore employed in practical objectives, and a suitable air space between the menisci is used. An increase in the curvatures produces a somewhat greater zonal aberration in the axial bundle but this often results in improved performance off the optical axis. However, for most photographic purposes, the image quality should be uniform over the entire angular field rather than excellent on axis and mediocre at the edge of the field.

I have discovered that the oblique spherical aberration of a lens of the specified type made of feasible optical materials can be reduced to unimportant residuals, provided certain relationships, which involve the thickness and curvature of the opposed surfaces of each of the negative meniscus components and the length of the central air space between them, are kept within restricted limits. A lens, in which the limits on such relationships are observed, gives the improved performance above mentioned, whereas, if the relationships are not kept within the limits, the performance of the lens deteriorates rapidly.

In an objective of the invention, the negative meniscus components may be either single elements, or one may be a single element and the other compounded of two or more elements, or both may be compounded of two or more elements. Such a negative meniscus component may also include two or more elements of overall meniscus form, which have "broken contact," such elements being not entirely in contact and, therefore, having an air lens between them. Preferably, any such air lens is of low optical power and has a central axial thickness less than about 0.05 of the equivalent focal length of the objective. If the negative meniscus components each consist of a single element, that element preferably has an index of refraction lying between 1.5 and 1.8.

Objectives of the invention all have one or more collective components exterior to each of the negative meniscus components, the collective components being either simple, or compounded of positive and negative elements, or some being simple and others compounded of positive and negative elements. The desired results may be obtained provided that the elements exterior to the negative meniscus components, even though containing air spaced negative elements or negative components, have a net collective effect. When the external collective components consist of simple collective elements, those elements preferably have an index of refraction lying between 1.58 and 1.8.

The relationships to be kept within the specified limits are four ratios, which, for convenience, may be designated $\tau_1$, $\rho_1$, $\tau_2$, and $\rho_2$. These ratios have a common denominator $\lambda$, which I define as the geometrical distance along the optical axis between the convex vertices of the negative meniscus components, as defined above. The distance $\lambda$ is, therefore, the sum of the overall geometrical thicknesses of the two meniscus components plus the length of the central air space and, in the new lens, the value of $\lambda$ lies between 0.5 F and 0.65 F, being the equivalent focal length of the lens.

A small value of $\lambda$ within the specified range implies a lens of wide angle and the lens speed obtained therewith will depend on the indices of refraction of the optical materials found feasible for the particular application. If materials of high index are used, it is possible to obtain a greater speed for a given performance than with materials of low index, but it will be appreciated that for many purposes, for example, ultraviolet photography, materials of low index will be desirable.

A large value of $\lambda$ within the specified range implies a lens of enhanced speed and, hence, low f-number, but with limited angular coverage. Again, the speed obtained, in the limit, will depend on the refractivities of the materials employed.

The ratio $\tau_1$ is that of the total geometrical central thickness T' of the first (long conjugate) negative meniscus component to $\lambda$. The ratio $\tau_2$ is the corresponding ratio of the total geometrical central thickness T" of the second negative meniscus component to $\lambda$. The total central thickness of either negative meniscus component is to be understood as the geometrical axial distance between the convex outer air surface of the component and the concave surface of the component which forms a boundary of the central air space in the system. The total central thickness of a negative meniscus component is, therefore, the sum of the geometrical axial thicknesses of the various elements and internal air lenses, of which the component may be made and, if the negative meniscus component is a single element, the total central thickness of the component is merely the axial geometrical thickness of the element.

The ratio $\rho_1$ is the ratio of the radius $R_5$ of the concave air surface of the first negative meniscus component to $\lambda$ and the ratio $\rho_2$ is the corresponding ratio of the radius $R_6$ of the concave air surface of the second negative meniscus component to $\lambda$. The ratios $\rho_1$ and $\rho_2$ are to be considered as absolute values and hence are always taken as positive quantities.

I have found that, to obtain a lens of the specified type, which gives the desired improved performance, it is necessary to maintain the values of the four ratios within definite limits, as follows. The value of $\tau_1$ should lie between 0.1 and 0.4, so that the value of $T'$ ranges between $0.1\lambda$ and $0.4\lambda$, and the value of $\rho_1$ should lie between 0.31 and 0.45, so that the value of $R_5$ ranges between $0.31\lambda$ and $0.45\lambda$. The limits of the value of $\tau_2$ are 0.1 and 0.325, so that the value of $T''$ ranges between $0.1\lambda$ and $0.325\lambda$, and, for the value of $\rho_2$, the limits are 0.31 and 0.50, so that the value of $R_6$ ranges between $0.31\lambda$ and $0.50\lambda$.

It is obvious that not all media are suitable for the elements providing the concave air surfaces. Thus, a medium having an index of 1.35 would offer no advantageous state of correction and a medium with an index of 1.9 would have too strong a refraction for a given curve. The index for the specified media should, accordingly, lie between 1.50 and 1.80.

For the purposes of this invention, it is not necessary to place limits on the nature of the exterior positive elements and the principles of the invention will apply so long as these elements, whether single, multiple, or severally compounded, provide a net collective action on the light rays before they enter the first negative meniscus component and after they leave the second negative meniscus component. It will be understood that, by suitable selection of these external elements in form and construction, it is possible to obtain an increase of speed of the lens system, or unusual excellence of the central field, or superior distortion correction, etc., as may be required in a given application. The basic contribution of the negative meniscus components in reducing oblique spherical aberration will be unaffected by these external components, except with respect to the power of the system. The construction of the external components affects oblique spherical aberration, but, in all cases of which I am aware, any attempt to reduce oblique spherical aberration by compensation in the external collective components results in exaggerated astigmatism of the central bundles or, if astigmatism is eliminated, in correction of oblique spherical aberration for only limited angular fields and with large overcompensation beyond. Compounding of the negative meniscus components is usually better for the purpose but such compounding must be considered in its detailed relationship to the particular portion of the negative domain defined by my relationships.

I have found that a lens system with unusually good performance over a restricted field can be produced by adopting compounded negative meniscus components to obtain maximum optical power without taking higher order astigmatism into account. By compounding the second negative meniscus component of a positive high index element and a negative medium index element, or, more precisely, by causing an increase of index across the cemented interface, a marked gain in optical power for a given performance, or, conversely, a marked gain in performance at a fixed lens speed, may be obtained. Such considerations, however, would not necessarily apply for large angular fields, unless compensating means can be found.

I have found that, if the difference in index at the second cemented surface, that is, the cemented surface of the second negative meniscus component, exceeds 0.03, the curvature of this interface becomes important in compensating for the residual aberrations. If the difference of index at the cemented surface referred to is smaller than 0.03, either no benefit is to be gained or else appreciable compensation is gained only with an excessive curvature of the cemented surface, which curvature is likely to result in marked variation of the compensation with color, because of the requisite large difference in $\nu$ values of the positive and negative elements. Finally, I have found that, when practical optical materials having an index difference greater than 0.03 are used for the second negative meniscus component in the lens system of the invention, the reciprocal of the radius of the second cemented interface expressed in units of the equivalent focal length must lie between $+2$ and $-2$. Greater positive curvatures are limited by the practical consideration of diameters of the second element of the meniscus, plus over-compensation, while negative curvatures less than $-1$ are not only incompatible with the requirements of color correction for practicable optical materials, but also fail to produce any marked improvements in either lens power or compensation of the oblique images.

Taking into account the above, there are favorable values of the ratios $\tau_1$, $\rho_1$, $\tau_2$, and $\rho_2$ within the specified limits for the adopted lens form, and the values of the ratios within the ranges given will vary, according to the application and the choice of glasses.

In the accompanying drawing, Figs. 1, 2 and 3 are, respectively, views of three following examples of lens systems embodying the invention.

*Example 1*

F=1.000   f/2

| Lens | $N_D$ | $\nu$ | Radii | | Thicknesses |
|---|---|---|---|---|---|
| I | 1.617 | 55.0 | $R_1=$ 0.575 | $t_1$ | 0.088 |
|  |  |  | $R_2=$ 1.796 | $S_1$ | 0.003 |
| II | 1.611 | 57.2 | $R_3=$ 0.351 | $t_2$ | 0.125 |
| III | 1.605 | 38.0 | $R_4=$ plano | $t_3$ | 0.038 |
|  |  |  | $R_5=$ 0.216 | $S_2$ | 0.282 |
| IV | 1.605 | 38.0 | $R_6=-0.272$ | $t_4$ | 0.038 |
| V | 1.620 | 60.3 | $R_7=$ plano | $t_5$ | 0.109 |
|  |  |  | $R_8=-0.352$ | $S_3$ | 0.003 |
| VI | 1.620 | 60.3 | $R_9=$ 5.902 | $t_6$ | 0.069 |
|  |  |  | $R_{10}=-0.635$ |  |  |

In the lens of Example 1, only standard optical glasses suitable for mass production are used. The lens of the example has high light transmission in large focal lengths, because of the glasses employed, and it affords a field of moderate covering power at uniform resolution and illumination, even though the zonal aberration has been permitted to be significant. The lens is extremely well corrected for distortion at moderate field angles.

Example 2

F = 1.000    f/2

| Lens | $N_D$ | $\nu$ | Radii | | Thicknesses |
|---|---|---|---|---|---|
| I | 1.620 | 60.3 | $R_1 = 0.498$ | $t_1$ | 0.077 |
| | | | $R_2 = 1.271$ | $S_1$ | 0.002 |
| II | 1.670 | 47.2 | $R_3 = 0.332$ | $t_2$ | 0.104 |
| III | 1.649 | 33.8 | $R_4 = 2.158$ | $t_3$ | 0.019 |
| | | | $R_5 = 0.224$ | $S_2$ | 0.307 |
| IV | 1.617 | 36.6 | $R_6 = -0.272$ | $t_4$ | 0.026 |
| V | 1.670 | 47.2 | $R_7 = -6.473$ | $t_5$ | 0.103 |
| | | | $R_8 = -0.357$ | $S_3$ | 0.002 |
| VI | 1.620 | 60.3 | $R_9 = 6.350$ | $t_6$ | 0.058 |
| | | | $R_{10} = -0.734$ | | |

Example 3

F = 1.000    f/2

| Lens | $N_D$ | $\nu$ | Radii | | Thicknesses |
|---|---|---|---|---|---|
| I | 1.657 | 51.2 | $R_1 = 0.542$ | $t_1$ | 0.082 |
| | | | $R_2 = 1.338$ | $S_1$ | 0.002 |
| II | 1.657 | 51.2 | $R_3 = 0.327$ | $t_2$ | 0.101 |
| III | 1.649 | 33.8 | $R_4 = 1.309$ | $t_3$ | 0.035 |
| | | | $R_5 = 0.219$ | $S_2$ | 0.311 |
| IV | 1.617 | 36.6 | $R_6 = -0.275$ | $t_4$ | 0.018 |
| V | 1.657 | 51.2 | $R_7 = 1.091$ | $t_5$ | 0.098 |
| | | | $R_8 = -0.360$ | $S_3$ | 0.002 |
| VI | 1.670 | 47.2 | $R_9 = $ plano | $t_6$ | 0.054 |
| | | | $R_{10} = -0.653$ | | |

In the lens of Examples 2 and 3, the zonal aberration over the entire field has been diminished by the use of high index positive materials, a result which is fully consistent with the performance criteria set forth above.

Objectives made in accordance with my invention provide optical images far off the optical axis that are nearly identical in sharpness and contrast with the axial image, whereas, prior similar objectives often produce excellent axial images but deteriorating off-axis images. My objectives may thus be said to be corrected for larger central bundles of the aperture than heretofore at points far off the optical axis, even though the extreme rays retain, in the limit, overcorrected oblique spherical aberration of noticeable amount but unimportant light content. In establishing the final state of correction, I have taken into account the relationships between microscopic structure of the image and microscopic contrast. Thus, for maximum depth of focus at a high level of resolution and of contrast, I have endeavored to balance the residual aberrations so as to obtain as much as possible of the light from the aperture within two Rayleigh limits. For the highest resolution, at a sacrifice of depth of focus, it is possible to balance the light from a somewhat smaller portion of the aperture within one Rayleigh limit, although, when that is done, the contrast of the image for the coarser grained emulsions is not optimum. Since, with my objectives, only the outermost portion of the aperture exhibits oblique spherical aberration, and with a steeper gradient than is customary in objectives of shallower internal curvatures, I have utilized vignetting to an extent sufficient to remove the harmful effects of the oblique spherical aberration to the level, where good contrast is maintained for large and small detail alike. Such vignetting is much less than has heretofore been normal in prior objectives.

This application is a continuation-in-part of my copending application, Serial No. 738,059, filed March 29, 1947, now abandoned, and is related to my copending applications Serial No. 779,914, filed October 15, 1947, now abandoned, and Serial No. 118,628, filed September 29, 1949.

I claim:

1. An optical objective made of glass components throughout and corrected for coma, astigmatism, field curvature, distortion, chromatic aberration, and both axial and oblique spherical aberrations, which comprises a pair of meniscus components each of net dispersive effect lying concave to each other at opposite ends of a central air space and a plurality of collective components disposed at opposite ends of the meniscus components, the length of the air space and the axial thicknesses of the meniscus components being such that the geometrical axial distance $\lambda$ between the outside convex vertices of the meniscus components ranges from 0.5 F and 0.65 F, F being the equivalent focal length of the objective, the objective being further characterized in that T′ ranges between 0.1λ and 0.4λ, T″ ranges between 0.1λ and 0.325λ, $R_5$ ranges between 0.31λ and 0.45λ, and $R_6$ ranges between 0.31λ and 0.50λ, T′ and T″ being, respectively, the axial thicknesses of the first (long conjugate side) and the second meniscus components, $R_5$ and $R_6$ being, respectively, the radii of the inner concave surfaces of the first and second meniscus components, and the radii being considered to be of positive algebraic sign.

2. An objective as defined in claim 1, in which the external collective components consist of single elements lying at opposite ends of the pair of meniscus components and each collective element has an index of refraction greater than 1.58 and less than 1.8.

3. An objective as defined in claim 1, in which each negative meniscus component is compounded of at least two elements.

4. An objective as defined in claim 1, in which each negative meniscus component consists of a pair of elements cemented together and the element in each component defining the central air space has an index of refraction lying between 1.5 and 1.8.

5. An objective as defined in claim 1, in which each negative meniscus component consists of two elements cemented together, the difference in index of refraction across the cemented surface of the second component being greater than 0.03 and the reciprocal of the radius of the cemented surface of the second component lying between +2 F and −1 F.

6. An optical objective having numerical data substantially as follows:

F = 1.000    f/2

| Lens | $N_D$ | $\nu$ | Radii | | Thicknesses |
|---|---|---|---|---|---|
| I | 1.617 | 55.0 | $R_1 = 0.578$ | $t_1$ | 0.088 |
| | | | $R_2 = 1.896$ | $S_1$ | 0.003 |
| II | 1.611 | 57.2 | $R_3 = 0.351$ | $t_2$ | 0.125 |
| III | 1.605 | 38.0 | $R_4 = $ plano | $t_3$ | 0.038 |
| | | | $R_5 = 0.216$ | $S_2$ | 0.282 |
| IV | 1.605 | 38.0 | $R_6 = -0.272$ | $t_4$ | 0.038 |
| V | 1.620 | 60.3 | $R_7 = $ plano | $t_5$ | 0.109 |
| | | | $R_8 = -0.352$ | $S_3$ | 0.003 |
| VI | 1.620 | 60.3 | $R_9 = 5.902$ | $t_6$ | 0.069 |
| | | | $R_{10} = -0.635$ | | | in which $R_1$, $R_2$ . . . represent the radii of curvature of the individual lens surfaces counting from the long conjugate side, $t_1$, $t_2$ ... represent the axial thickness of the individual elements, and $S_1$, $S_2$, $S_3$ represent the axial air separations between the components.

7. An optical objective having numerical data substantially as follows:

$F = 1.000 \quad f/2$

| Lens | $N_D$ | $\nu$ | Radii | | Thicknesses |
|---|---|---|---|---|---|
| I | 1.620 | 60.3 | $R_1 = 0.498$ $R_2 = 1.271$ | $t_1$ $S_1$ | 0.077 0.002 |
| II | 1.670 | 47.2 | $R_3 = 0.332$ | $t_2$ | 0.104 |
| III | 1.649 | 33.8 | $R_4 = 2.158$ $R_5 = 0.224$ | $t_3$ $S_2$ | 0.019 0.307 |
| IV | 1.617 | 36.6 | $R_6 = -0.272$ | $t_4$ | 0.026 |
| V | 1.670 | 47.2 | $R_7 = -6.473$ $R_8 = -0.357$ | $t_5$ $S_3$ | 0.103 0.002 |
| VI | 1.620 | 60.3 | $R_9 = 6.350$ $R_{10} = -0.734$ | $t_6$ | 0.058 | in which $R_1$, $R_2$ ... represent the radii of curvature of the individual lens surfaces counting from the long conjugate side, $t_1$, $t_2$ ... represent the axial thickness of the individual elements, and $S_1$, $S_2$, $S_3$ represent the axial air separations between the components.

8. An optical objective having numerical data substantially as follows:

$F = 1.000 \quad f/2$

| Lens | $N_D$ | $\nu$ | Radii | | Thicknesses |
|---|---|---|---|---|---|
| I | 1.657 | 51.2 | $R_1 = 0.542$ $R_2 = 1.338$ | $t_1$ $S_1$ | 0.082 0.002 |
| II | 1.657 | 51.2 | $R_3 = 0.327$ | $t_2$ | 0.101 |
| III | 1.649 | 33.8 | $R_4 = 1.309$ $R_5 = 0.219$ | $t_3$ $S_2$ | 0.035 0.311 |
| IV | 1.617 | 36.6 | $R_6 = -0.275$ | $t_4$ | 0.018 |
| V | 1.657 | 51.2 | $R_7 = 1.091$ $R_8 = -0.360$ | $t_5$ $S_3$ | 0.098 0.002 |
| VI | 1.670 | 47.2 | $R_9 =$ plano $R_{10} = -0.653$ | $t_6$ | 0.054 | in which $R_1$, $R_2$ ... represent the radii of curvature of the individual lens surfaces counting from the long conjugate side, $t_2$, $t_3$ ... represent the axial thickness of the individual elements, and $S_1$, $S_2$, $S_3$ represent the axial air separations between the components.

JAMES G. BAKER.

REFERENCES CITED

The following references are of record in the file of this patent:

UNITED STATES PATENTS

| Number | Name | Date |
|---|---|---|
| 583,336 | Rudolph | May 25, 1897 |
| 1,786,916 | Merte | Dec. 30, 1930 |
| 1,955,591 | Lee | Apr. 17, 1934 |
| 2,117,252 | Lee | May 10, 1938 |
| 2,336,207 | Aklin | Dec. 7, 1943 |
| 2,343,627 | Aklin | Mar. 7, 1944 |
| 2,349,893 | Warmisham et al. | May 30, 1944 |